(12) United States Patent
Wagers et al.

(10) Patent No.: US 10,690,378 B2
(45) Date of Patent: Jun. 23, 2020

(54) FURNACE CABINET WITH THREE BAFFLES

(71) Applicant: Trane International Inc., Piscataway, NJ (US)

(72) Inventors: Nathan Wagers, Henderson, TX (US); Rosario Totaro, Ewing, NJ (US); Bright Wei Liang Sun, Shanghai (CN); Shuo Zhao, Shanghai (CN)

(73) Assignee: Trane International Inc., Piscataway, NJ (US)

( * ) Notice: Subject to any disclaimer, the term of this patent is extended or adjusted under 35 U.S.C. 154(b) by 619 days.

(21) Appl. No.: 14/932,428

(22) Filed: Nov. 4, 2015

(65) Prior Publication Data

US 2016/0131395 A1    May 12, 2016

Related U.S. Application Data

(60) Provisional application No. 62/076,729, filed on Nov. 7, 2014.

(51) Int. Cl.
| | | |
|---|---|---|
| *F24H 3/00* | (2006.01) | |
| *F24H 3/08* | (2006.01) | |
| *F24H 9/00* | (2006.01) | |
| *F24H 8/00* | (2006.01) | |
| *F24H 9/02* | (2006.01) | |

(52) U.S. Cl.
CPC ............. *F24H 3/087* (2013.01); *F24H 8/00* (2013.01); *F24H 9/0063* (2013.01); *F24H 9/02* (2013.01); *Y02B 30/102* (2013.01)

(58) Field of Classification Search
CPC . F23G 5/46; F24H 9/2035; F24H 1/52; F24H 1/124; F24H 3/087; F24H 8/00; F24H 9/0026; F24H 3/105; F24H 9/0063; F24D 2220/06; F24D 5/02; F28F 1/06; F28F 1/08; F28F 2009/224; F28F 2225/04
See application file for complete search history.

(56) References Cited

U.S. PATENT DOCUMENTS

| | | | | |
|---|---|---|---|---|
| 4,187,090 A | * | 2/1980 | Bizzarro | ............... B01D 45/08 165/111 |
| 4,557,249 A | * | 12/1985 | Sweedyk | ............... F24H 3/087 126/110 AA |
| 4,895,137 A | | 1/1990 | Jones et al. | |
| 4,987,881 A | * | 1/1991 | Narang | ................... F23L 15/04 116/DIG. 25 |
| 6,026,804 A | * | 2/2000 | Schardt | .................... F24H 1/40 126/344 |

(Continued)

*Primary Examiner* — Jason Lau
(74) *Attorney, Agent, or Firm* — Conley Rose, P.C.; J. Roberts Brown, Jr.; Kristian R. Sullivan

(57) ABSTRACT

A condensing gas-fired furnace has a furnace cabinet, a primary heat exchanger, a secondary heat exchanger located upstream relative to the primary heat exchanger with regard to location within a circulation airflow path, a first baffle carried by a first wall of the furnace cabinet, a second baffle carried by a second wall of the furnace cabinet, wherein the second baffle is located opposite the first baffle, and wherein the second wall is located opposite the first wall, and a third baffle carried by a third wall of the furnace cabinet, wherein the third baffle is located adjacent to the first baffle and the second baffle, and wherein the third wall is located adjacent to the first wall and the second wall.

18 Claims, 15 Drawing Sheets

(56) References Cited

U.S. PATENT DOCUMENTS

| | | |
|---|---|---|
| 6,564,794 B1 | 5/2003 | Zia et al. |
| 6,564,795 B1 | 5/2003 | Sears et al. |
| 8,656,905 B2 | 2/2014 | Noman et al. |
| 2013/0075062 A1 | 3/2013 | Noman et al. |
| 2014/0158115 A1 | 6/2014 | Noman et al. |

* cited by examiner

FURNACE CABINET WITH THREE BAFFLES

CROSS-REFERENCE TO RELATED APPLICATIONS

The present application claims priority under 35 U.S.C. 119(e) to U.S. Provisional Patent Application No. 62/076,729 filed on Nov. 7, 2014 by Wagers, et al., and entitled "Furnace Cabinet with Three Baffles," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some heating, ventilation, and/or air conditioning (HVAC) systems often comprise a furnace for heating and/or otherwise conditioning interior spaces. Some HVAC systems comprise furnaces with baffles configured to redirect airflow into contact with heat exchangers. In some cases, baffles are placed in a heat exchanger compartment to reduce primary tube temperatures and increase the life expectancy of such tubes. In some furnaces, there may be a trade-off between reducing the tube temperatures, increasing air velocities, and increasing pressure drop, and thus increasing power consumption of a circulation fan blower motor. As tube temperatures decrease, external air velocities may increase, pressure drops may increase, power consumption may increase, and furnace fan efficiency may decrease.

SUMMARY

In some embodiments of the disclosure, a furnace is disclosed as comprising: a furnace cabinet; a primary heat exchanger; a secondary heat exchanger located upstream relative to the primary heat exchanger with regard to location within a circulation airflow path; a first baffle carried by a first wall of the furnace cabinet; a second baffle carried by a second wall of the furnace cabinet, wherein the second baffle is located opposite the first baffle, and wherein the second wall is located opposite the first wall; and a third baffle carried by a third wall of the furnace cabinet.

In other embodiments of the disclosure, a method operating a furnace is disclosed as comprising: providing a furnace comprising a furnace cabinet, a fan, a primary heat exchanger, a secondary heat exchanger located upstream relative to the primary heat exchanger with regard to location within a circulation airflow path, a first baffle carried by a first wall of the furnace cabinet, a second baffle carried by a second wall of the furnace cabinet, wherein the second baffle is located opposite the first baffle, and wherein the second wall is located opposite the first wall, and a third baffle carried by a third wall of the furnace cabinet; operating the fan to produce a circulation airflow; directing the circulation airflow towards the primary heat exchanger with each of the first baffle, the second baffle, and the third baffle; and exchanging heat between the circulation airflow and the primary heat exchanger.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Some furnaces may have airflow paths that are not optimized for contacting a heat exchanger with the airflow through the airflow paths. Allowing air to pass through a furnace while producing unnecessary recirculation patterns and separation zones adjacent to a heat exchanger may reduce the efficiency of the furnace. In some embodiments of this disclosure, a condensing gas-fired furnace is provided that efficiently manages airflow through the furnace, increases airflow contact with a heat exchanger installed in the furnace, and consequently increases the efficiency of the furnace.

Figure 1:
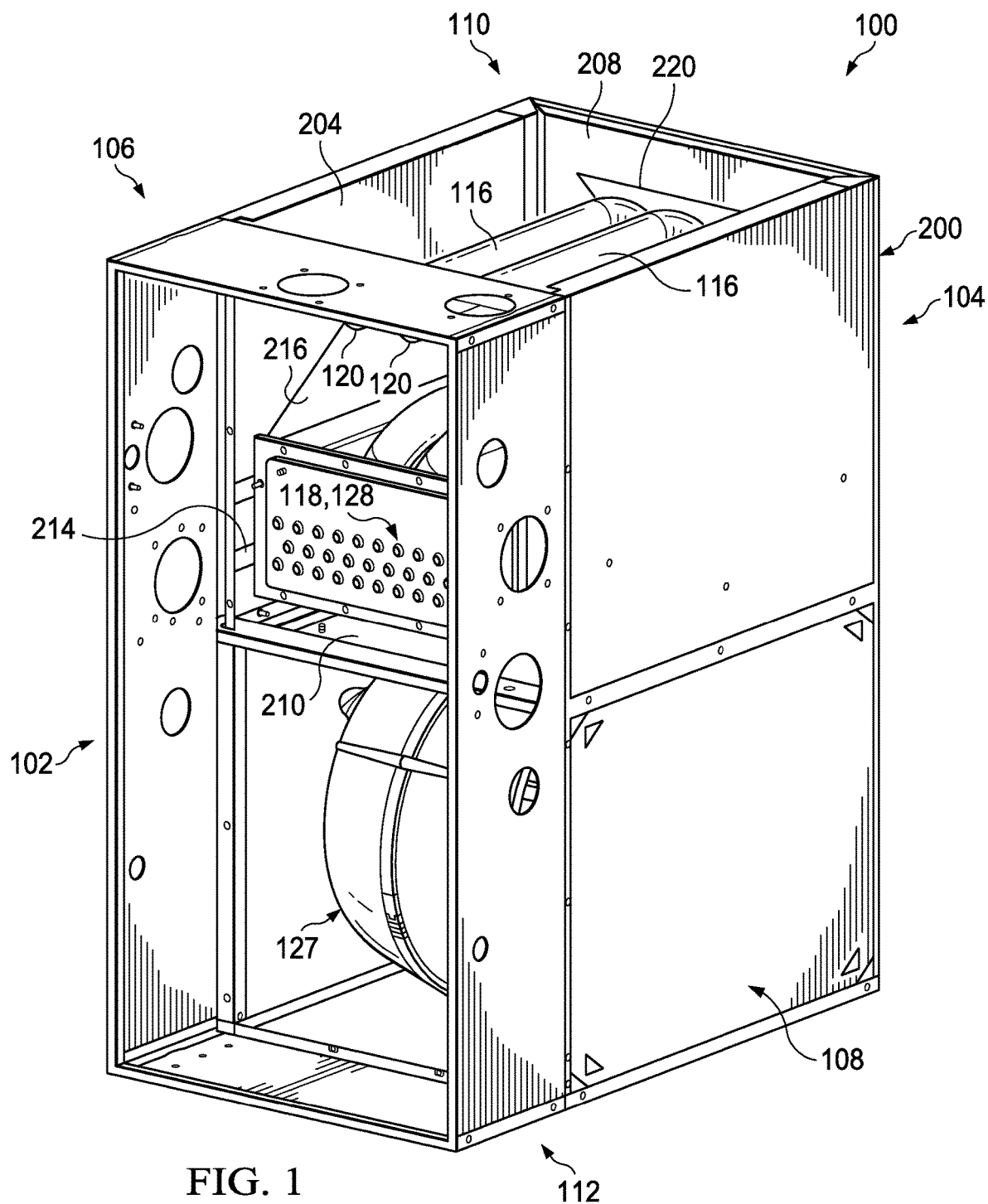
FIG. 1 is an oblique view of a furnace according to an embodiment of the disclosure.
Figure 2:
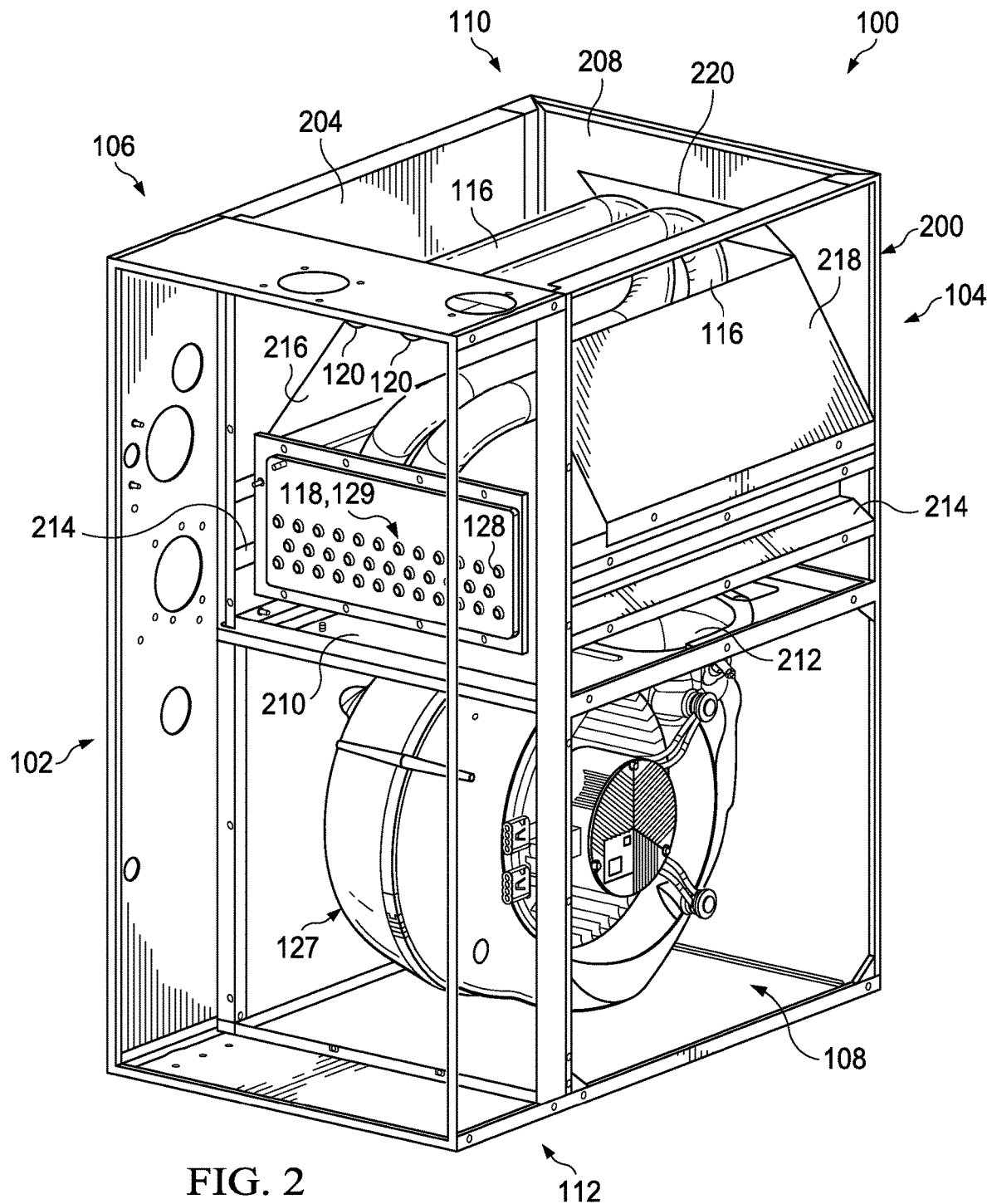
FIG. 2 is another oblique view of the furnace of FIG. 1 shown with some right side components of the furnace removed to better show the interior components of the furnace according to an embodiment of the disclosure.

Referring now to FIGS. 1 and 2, an oblique right side view of a condensing gas-fired furnace 100 and another oblique right side view of the furnace 100 having some right side components of the furnace 100 removed to better show the interior components of the furnace 100 are shown, respectively, according to an embodiment of the disclosure. In this embodiment, the furnace 100 is configured as an indoor furnace 100 that provides conditioned, heated air to an interior space. The components of the furnace 100, however, may be equally employed in an outdoor or weatherized furnace to condition an interior space. Moreover, the furnace 100 may be used in residential or commercial applications. The furnace 100 may generally comprise a front side 102, rear side 104, left side 106, right side 108, top side 110, and bottom side 112.

In this embodiment, the furnace 100 may comprise one or more burner assemblies configured to combust fuel and oxygen so that resultant combustion gases are forced into a plurality of primary heat exchangers 116, and thereafter into a finned, condensing, secondary heat exchanger 118. The primary heat exchangers 116 may extend from the burner assembly to the secondary heat exchanger 118. In this embodiment, each burner assembly may have an associated primary heat exchanger 116 such that the primary heat exchanger 116 is in the combustion airflow path of its associated burner assembly. In general, the total number of burner assemblies and/or primary heat exchangers 116 may vary depending upon the desired capacity of the furnace 100. In alternative embodiments, the furnace 100 may comprise a non-condensing furnace and the various components of the non-condensing furnace may be different than the components of furnace 100.

Figure 3:
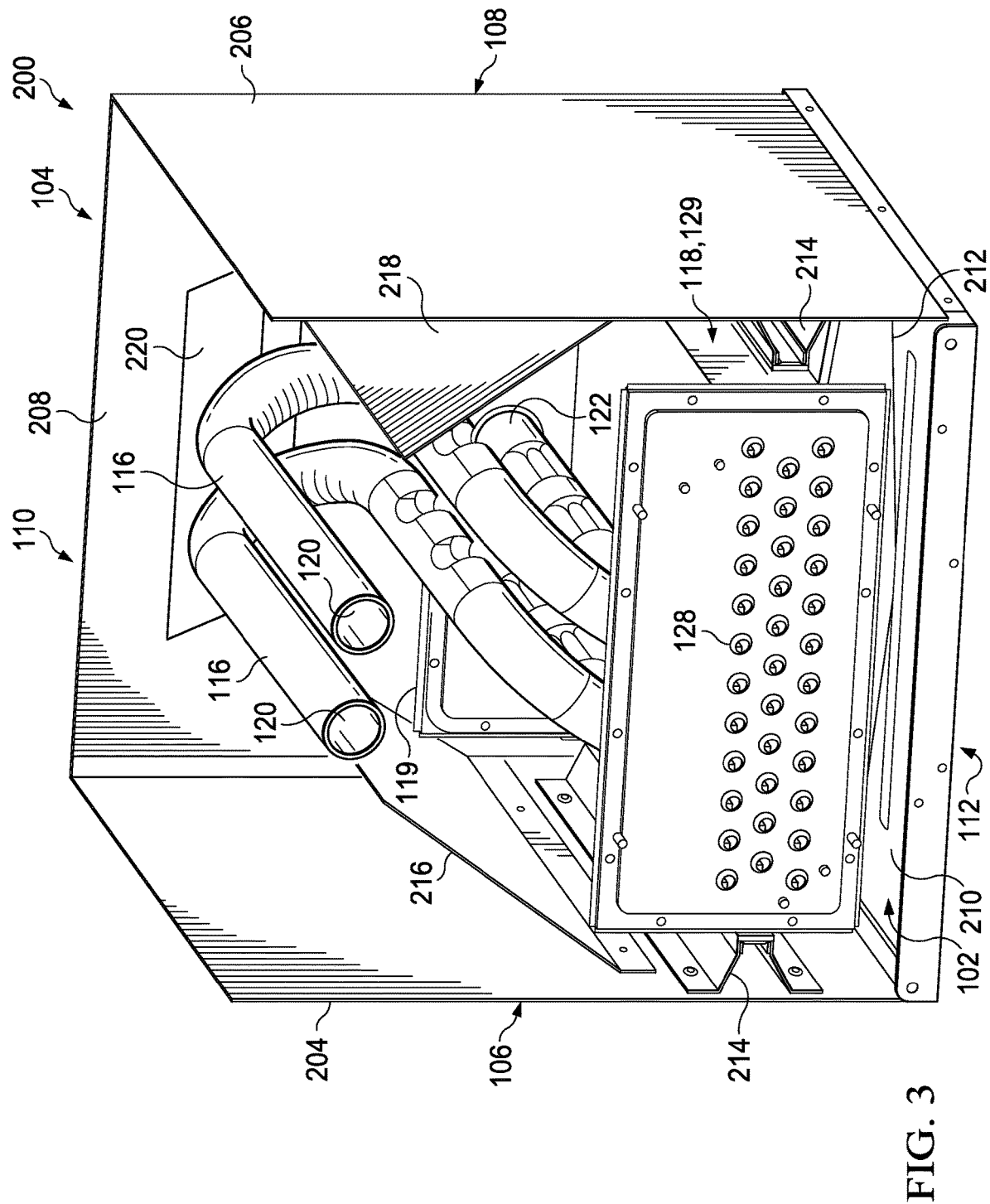
FIG. 3 is an oblique view of a furnace cabinet of the furnace of FIGS. 1-2 according to an embodiment of the disclosure.

Each primary heat exchanger 116 may comprise a bent, S-shaped tubular member that extends through a tortuous path to enhance the surface area available for heat transfer with the surrounding circulation air. Each primary heat exchanger 116 may comprise a first open end 120 defining a flue gas inlet and a second open end 122 defining a flue gas outlet. As shown in FIG. 3, the second open end 122 of each primary heat exchanger 116 may feed the secondary heat exchanger 118 so that the primary heat exchangers 116 transport hot flue gases to the secondary heat exchanger 118. Although the primary heat exchangers 116 are tubular in some embodiments, the primary heat exchangers 116 may comprise, for example, clamshell, drum, shell and tube-type, and/or any other suitable type of heat exchangers.

In general, combustion air may be introduced into the furnace 100 either in an induced draft mode by pulling air through the system or in a forced draft mode by pushing air through the system. In this embodiment, the induced draft mode may be employed by pulling the hot flue gases from the secondary heat exchanger 118 with a blower or fan by creating a relatively lower pressure at the exhaust of the secondary heat exchanger 118. A control system may control the blower or fan to an appropriate speed to achieve adequate air flow for a desired firing rate through the burner assemblies. Increasing the fan speed of the blower or fan may introduce more air to the air/fuel mixture, thereby changing the characteristics of the combustion within the burner assemblies.

A circulation blower 127 may blow circulation air across the external surfaces of the primary heat exchangers 116 and the secondary heat exchanger 118 to enable the transfer of thermal energy from the primary heat exchangers 116 and the secondary heat exchanger 118 to the air. The heated, exiting airflow may then be distributed to a conditioned area. The furnace 100 is shown in a first orientation in which the circulation blower 127 is closer to the bottom side 112 of the furnace 100 relative to the primary heat exchangers 116 and blows the circulation air across the primary heat exchangers 116 and upwards toward the top side 110 of the furnace 100.

While moving through the primary heat exchangers 116 and then the secondary heat exchanger 118, the hot flue gases may begin to cool and continue cooling as they move through the secondary heat exchanger 118. The flue gases may thereafter be directed to the outside environment. As the flue gases cool throughout the secondary heat exchanger 118, the flue gases may cool below the dew point temperature of the water vapor, which may be mixed with corrosive combustion products, producing a corrosive condensate. Accordingly, this system may be referred to as a condensing gas-fired furnace 100. A cold header may provide a drainage path for managing and/or draining the condensate and/or any other liquid. In some cases, the condensate may form within and/or flow through tubes 128 of the secondary heat exchanger 118. The secondary heat exchanger 118 may further comprise fins, and the combination of tubes 128 and associated fins are additionally represented as a heat exchanger slab 129. The tubes 128 may comprise a corrosion resistant metal, such as, but not limited to 29-4C stainless steel, 2205 stainless steel, T140 aluminized steel, and/or any other suitable corrosion resistant material.

Figure 4:
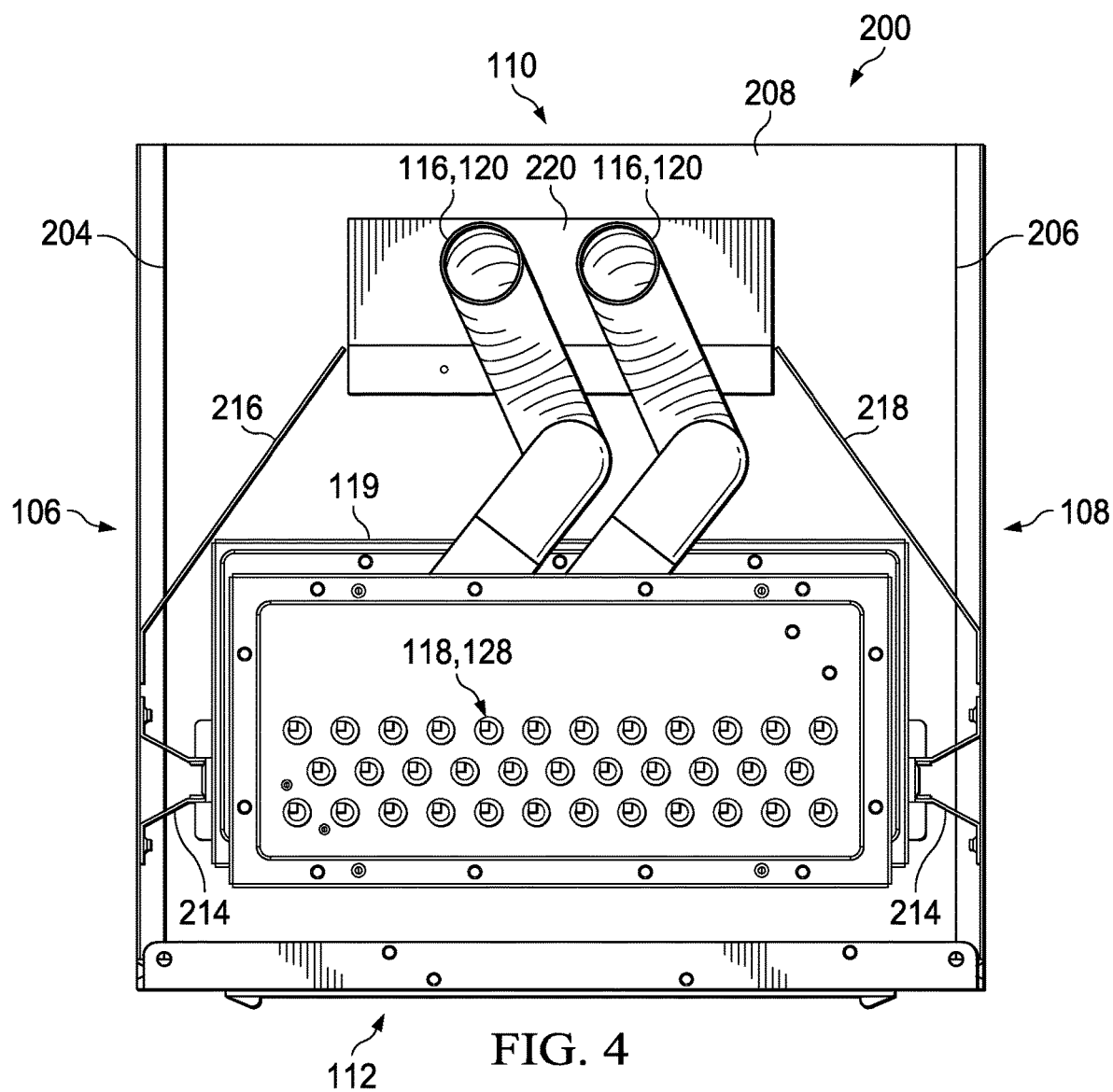
FIG. 4 is an orthogonal front view of the furnace cabinet of FIG. 3 according to an embodiment of the disclosure.
Figure 5:
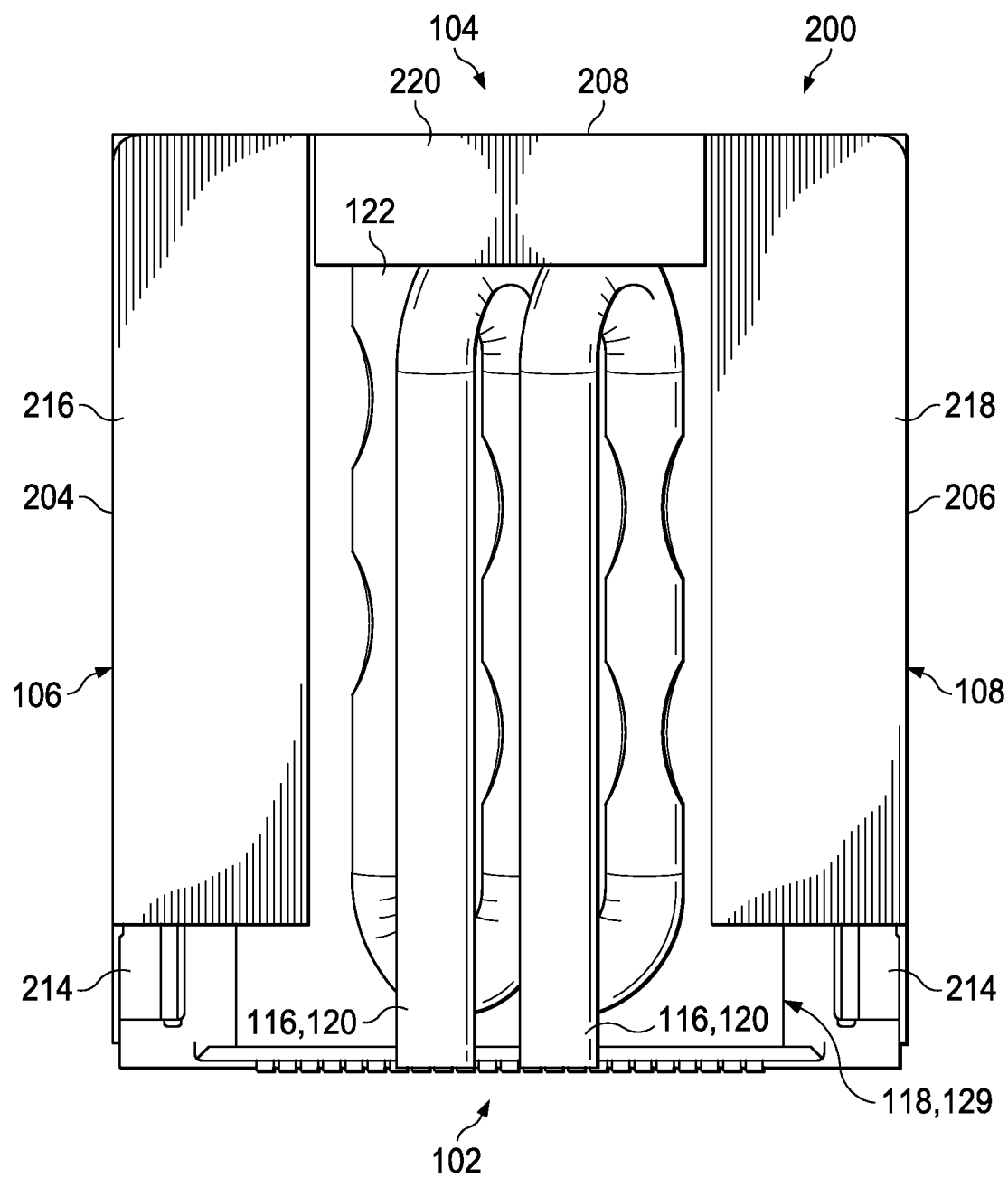
FIG. 5 is an orthogonal top view of the furnace cabinet of FIG. 3 according to an embodiment of the disclosure.

Referring now to FIGS. 3-5, an oblique view, orthogonal front view, and an orthogonal top view of a furnace cabinet 200 of the furnace 100 of FIGS. 1-2 are shown, respectively, without a front wall (see FIGS. 1-2) attached. In some embodiments, the furnace cabinet 200 may be generalized as comprising an interior duct comprising the front wall, a left wall 204, a right wall 206, and a back wall 208. Generally, circulation air delivered through the furnace 100 by the circulation blower 127 may enter the furnace cabinet 200 though a lower wall 210 via an aperture 212 of the lower wall 210. Mounting rails 214 carried by the left wall 204 and the right wall 206 generally force air between mounting rails 214. Of course, in embodiments where the furnace 100 is a non-condensing furnace, the furnace 100 may comprise no secondary heat exchanger 118.

In this embodiment, the furnace cabinet 200 further comprises a left baffle 216, a right baffle 218, and a rear baffle 220. The left baffle 216 generally comprises a bent plate attached to the left wall 204 at a vertical location (1) vertically higher than and downstream relative to a vertically highest portion and most downstream portion of the secondary heat exchanger 118 and (2) vertically lower than and upstream relative to a vertically lowest portion and most downstream portion of the primary heat exchangers 116. The left baffle 216 extends from the back wall 208 toward the front wall but stops short of extending to the front wall. Instead of extending all the way to the front wall, the left baffle 216 extends to a location generally associated with the onset of a forward located bend of the primary heat exchangers 116 as viewed from above (see FIG. 5). With increasing upward locations, the left baffle 216 increasingly protrudes rightward so that the rightward edge of the left baffle 216 is vertically located generally halfway along a rearward located bend of the primary heat exchangers 116 as viewed from the front (see FIG. 4). The rightward edge of the left baffle 216 is located at a rightward offset location from the left wall 204 so that the rightward edge of the left baffle 216 is offset a short distance from the leftmost located portion of the primary heat exchangers 116 as viewed from above (see FIGS. 4-5).

The right baffle 218 generally comprises a bent plate attached to the right wall 206 at a vertical location (1)

vertically higher than and downstream relative to a vertically highest portion and most downstream portion of the secondary heat exchanger 118 and (2) vertically lower than and upstream relative to a vertically lowest portion and most downstream portion of the primary heat exchangers 116. The right baffle 218 extends from the back wall 208 toward the front wall but stops short of extending to the front wall. Instead of extending all the way to the front wall, the right baffle 218 extends to a location generally associated with the onset of a forward located bend of the primary heat exchangers 116 as viewed from above (see FIG. 5). With increasing upward locations, the right baffle 218 increasingly protrudes leftward so that the leftward edge of the right baffle 218 is vertically located generally halfway along a rearward located bend of the primary heat exchangers 116 as viewed from the front (see FIG. 4). The leftward edge of the right baffle 218 is located at a leftward offset location from the right wall 206 so that the leftward edge of the right baffle 218 is offset a short distance from the rightmost located portion of the primary heat exchangers 116 as viewed from above (see FIGS. 4-5). In some cases, by locating each of the left baffle 216 and the right baffle 218 vertically higher than the secondary heat exchanger 118 hot header end plate 119 is so both the primary heat exchangers 116 and the secondary heat exchanger 118 and the headers connecting them can be removed and serviced in the field without the removal of any of the baffles 216, 218, 220 (See FIG. 4). The baffle locations 216, 218, 220 are unique and do not increase the service time of the furnace 100.

The rear baffle 220 generally comprises a bent plate attached to the back wall 208 at a vertical location substantially equal to the highest portions of each of the left baffle 216 and the right baffle 218. As viewed from above, the rear baffle 220 extends (1) from the rightward most location of the left baffle 216 to the leftward most location of the right baffle 218 and (2) from the back wall 208 to a location generally associated with a rearward portion of the rearward located bends of the primary heat exchangers 116 (see FIG. 5). With increasing upward locations, the rear baffle 220 increasingly protrudes forward so that the forward edge of the rear baffle 220 is vertically located generally aligned with the highest located portions of the primary heat exchangers 116 as viewed from the front (see FIG. 4).

In some embodiments, the left baffle 216, right baffle 218, and rear baffle 220 may work together to direct circulation airflow toward the primary heat exchangers 116 and generally toward a rear of the furnace cabinet 200 so that circulation airflow is prevented from bypassing the primary heat exchangers 116. In some embodiments, the increased airflow mass contacting the primary heat exchangers 116 may reduce temperatures of the primary heat exchangers 116 which may indicate an improved heat exchange between the primary heat exchangers 116 and circulation airflow passing through the furnace cabinet 200. In some cases, the baffles 216, 218, 220 may generally accomplish the improved heat exchange by increasing circulation airflow velocities along an upward vertical direction and as the circulation airflow generally passes the primary heat exchangers 116.

Figure 6A:
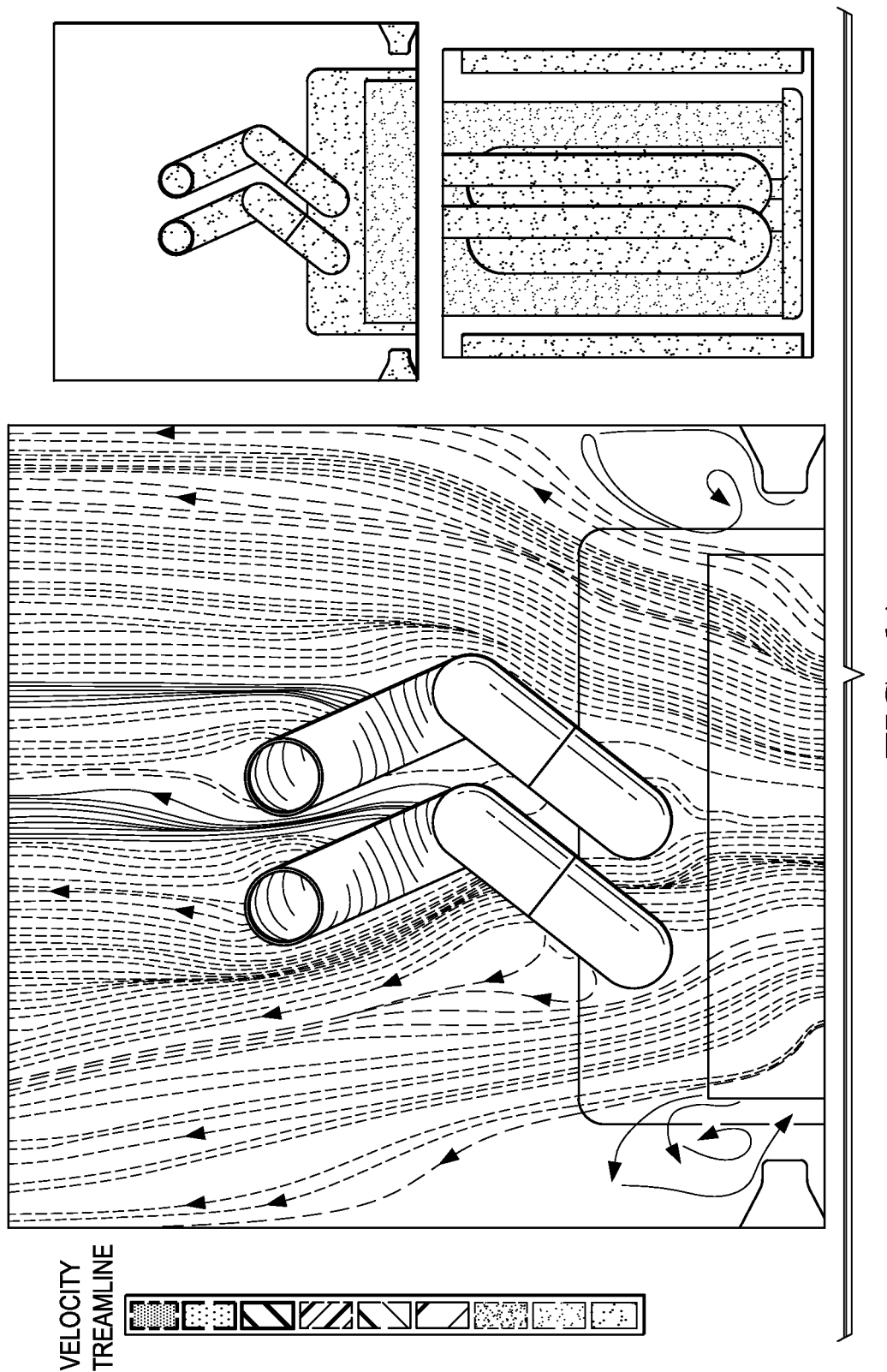
FIG. 6A is an airflow streamline at an orthogonal plane within a prior art furnace comprising no baffles.

Referring now to Prior Art FIG. 6A, an orthogonal front view of a computational fluid dynamic analysis of circulation airflow through a prior art furnace cabinet comprising no baffles is shown.

Figure 6B:
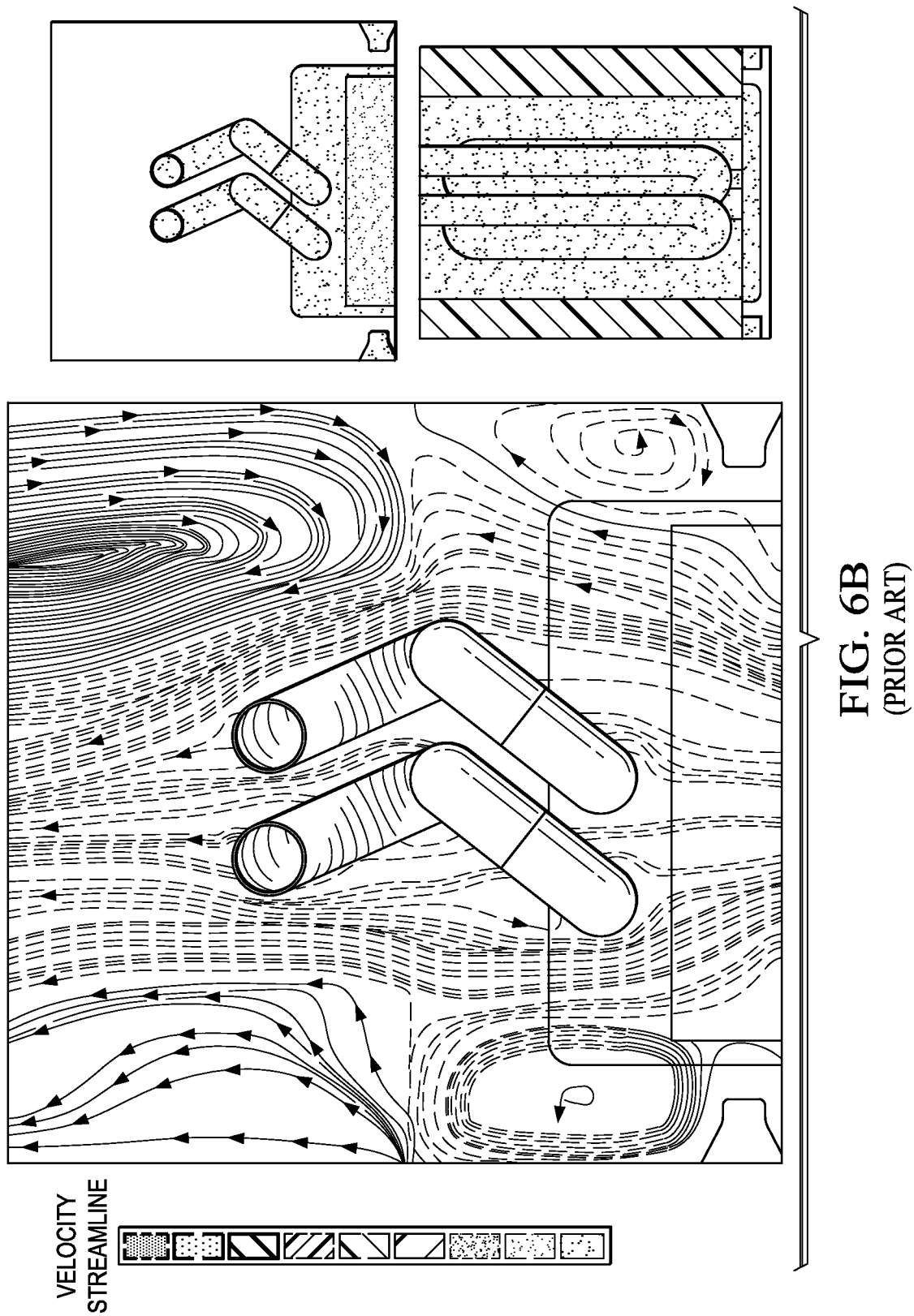
FIG. 6B is an airflow streamline at an orthogonal plane within a prior art furnace comprising two bluntly located baffles.

Referring now to Prior Art FIG. 6B, an orthogonal front view of a computational fluid dynamic analysis of circulation airflow through a prior art furnace cabinet comprising two bluntly located baffles is shown.

Figure 6C:
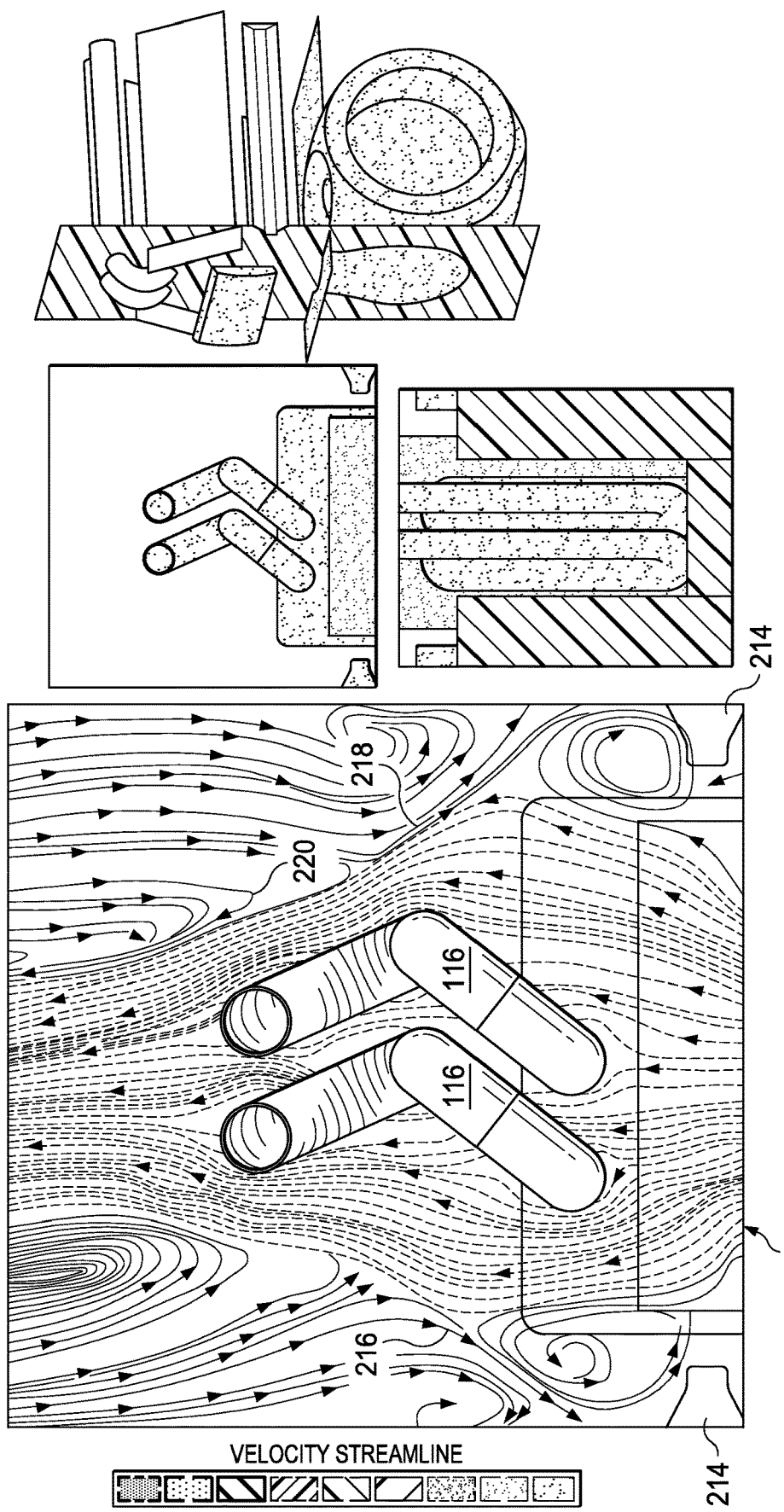
FIG. 6C is an airflow streamline at an orthogonal plane within the furnace cabinet of FIGS. 3-5 according to an embodiment of the disclosure.

Referring now to FIG. 6C, an orthogonal front view of a computational fluid dynamic analysis of circulation airflow through the furnace cabinet 200 of the furnace 100 is shown. In particular, FIG. 6C shows a velocity streamline representation of how provision of the baffles 216, 218, 220 cause circulation airflow to encounter a primary heat exchanger 116 at increasingly higher air velocity as distance is increased in the vertically upward direction. FIG. 6C also particularly illustrates the minimizing of recirculation and separation zones adjacent to the mounting rails 214 and adjacent to the tubes 128 of the primary heat exchanger 116. Velocities are increased while minimizing impact to the pressure drop of the circulation air system within the heat exchanger cavity. FIG. 6C additionally comprises a schematic orthogonal front view of the furnace cabinet 200, a schematic orthogonal top view of the furnace cabinet 200, and an oblique view of the furnace 100 showing the analysis plane location.

Figure 7A:
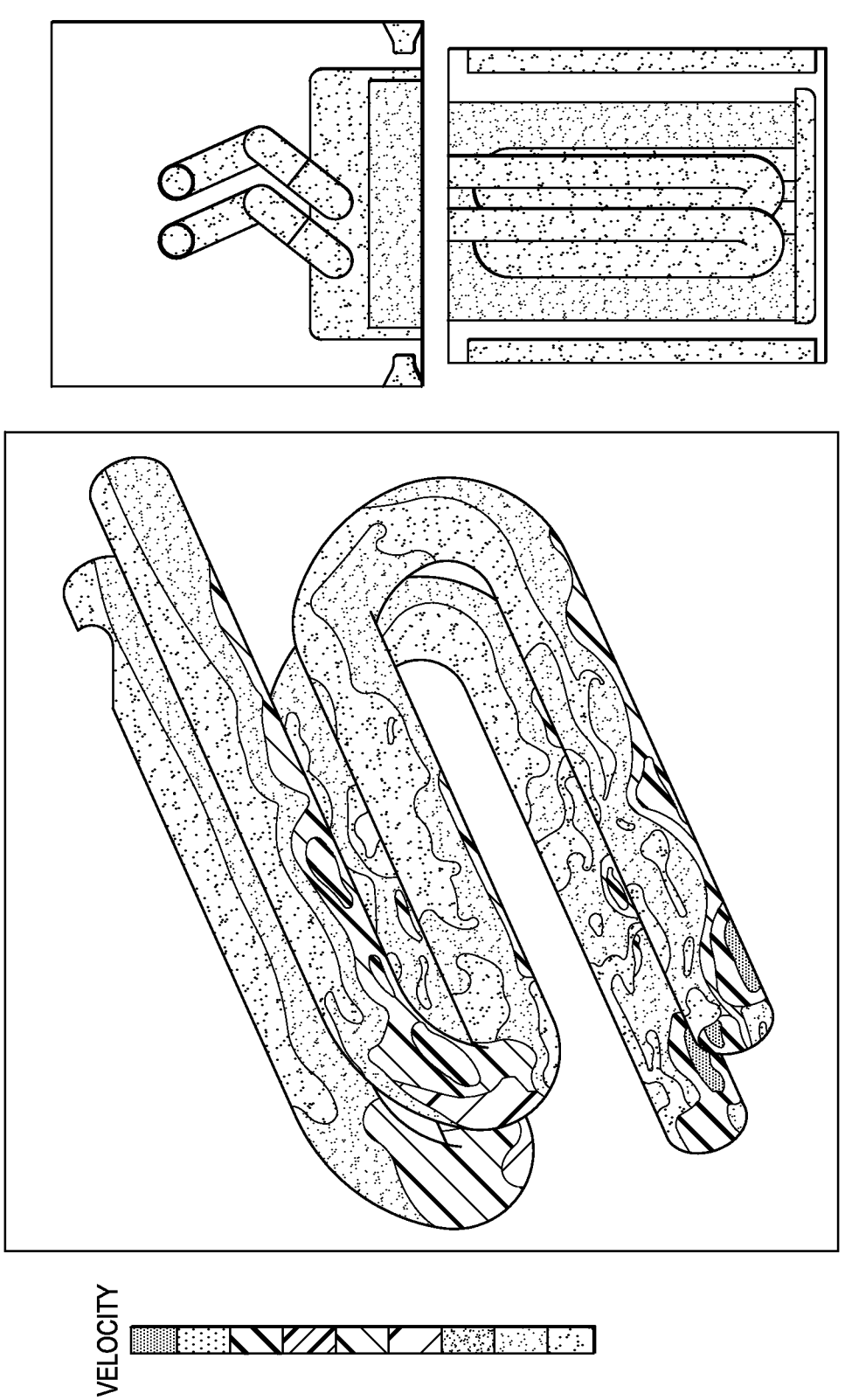
FIG. 7A is an airflow velocity contour of air contacting a primary heat exchanger of a prior art furnace cabinet comprising no baffles.

Referring now to Prior Art FIG. 7A, an oblique view of primary heat exchangers of a prior art furnace comprising no baffles is shown with a velocity contour mapped on the surfaces of the primary heat exchangers.

Figure 7B:
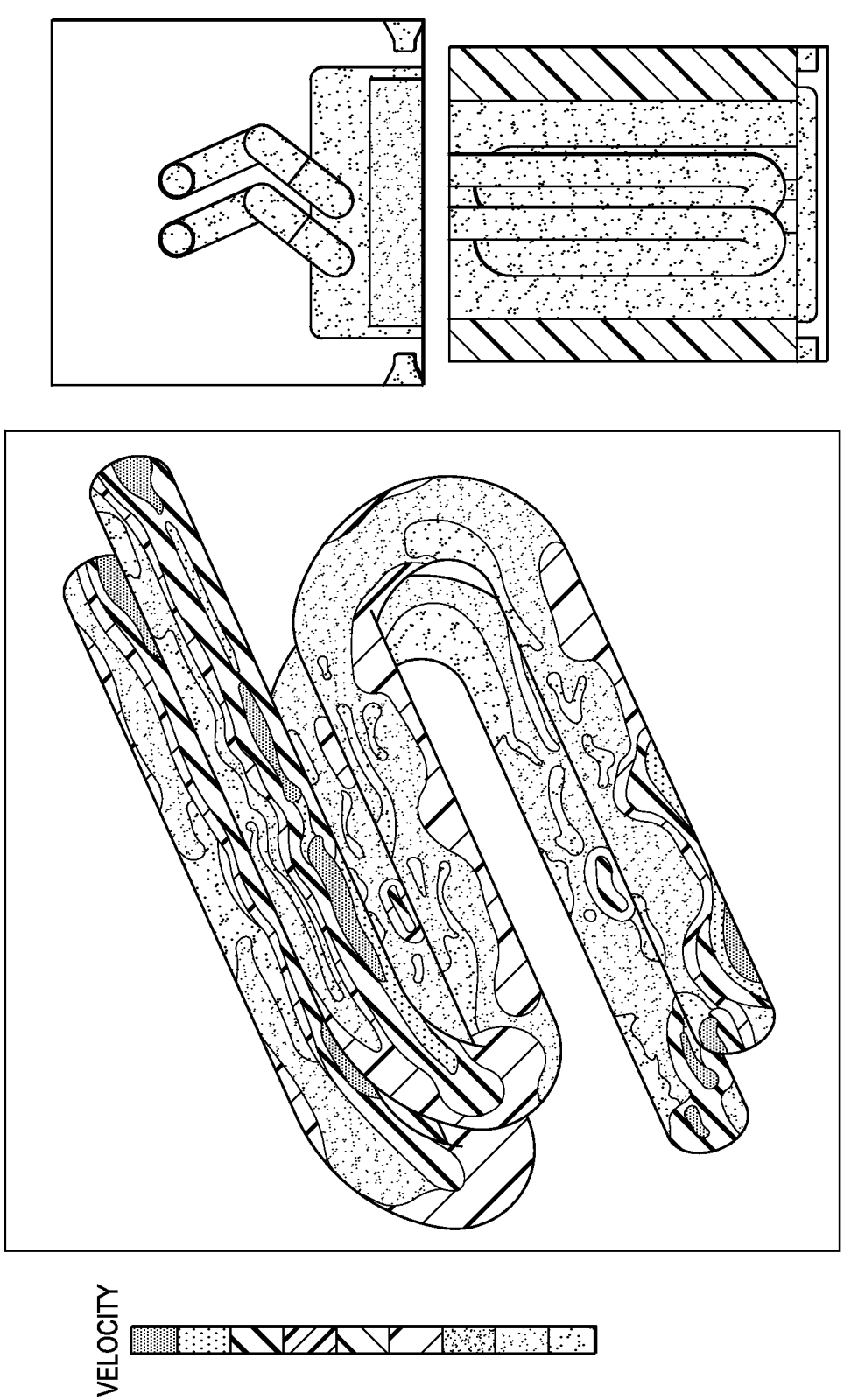
FIG. 7B is an airflow velocity contour of air contacting a primary heat exchanger of a prior art furnace cabinet comprising two bluntly located baffles.

Referring now to Prior Art FIG. 7B, an oblique view of primary heat exchangers of a prior art furnace comprising two bluntly located baffles is shown with a velocity contour mapped on the surfaces of the primary heat exchangers.

Figure 7C:
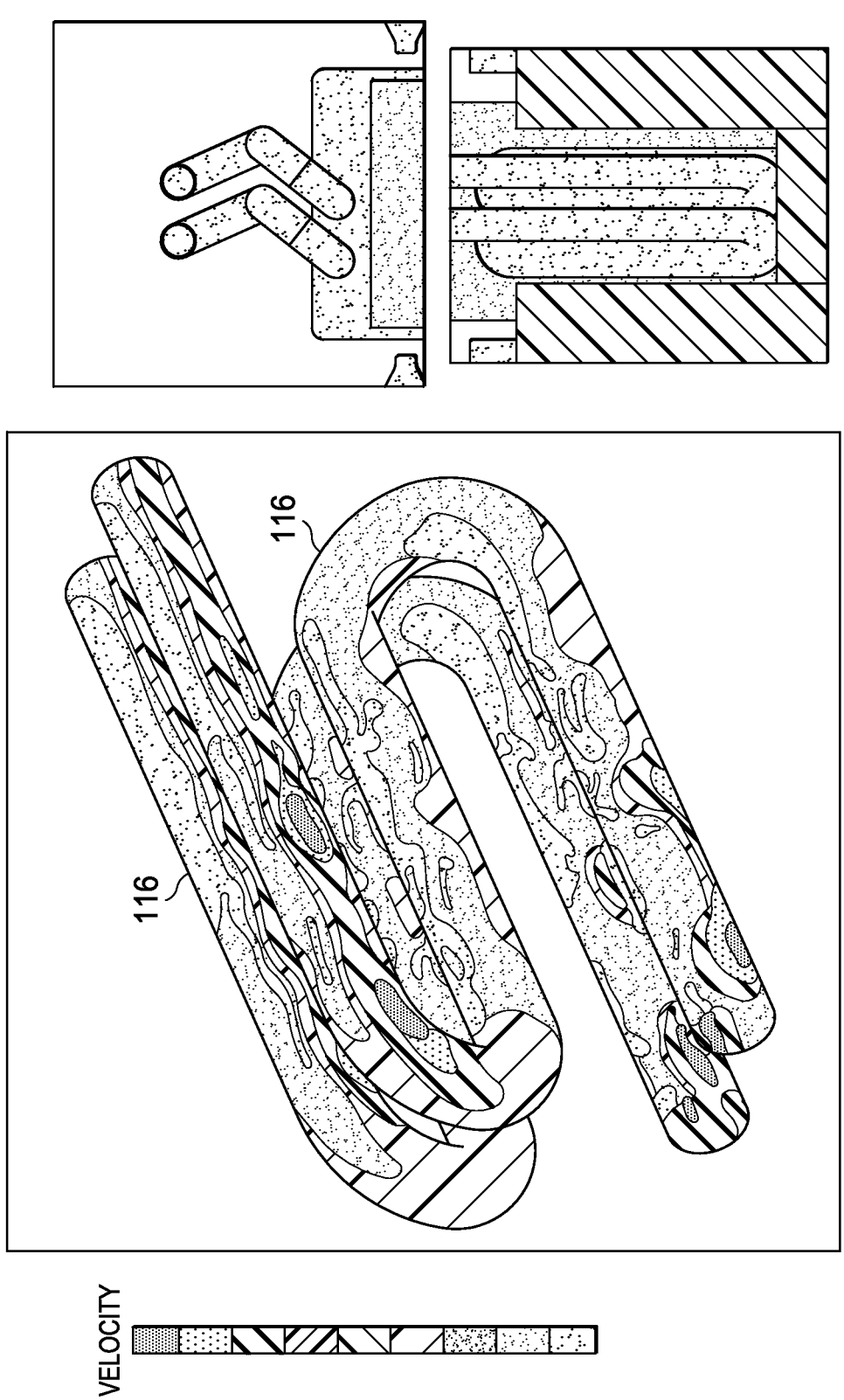
FIG. 7C is an airflow velocity contour of air contacting a primary heat exchanger of the furnace cabinet of FIGS. 3-5 according to an embodiment of the disclosure.

Referring now to FIG. 7C, the primary heat exchangers 116 of furnace 100 are shown with a velocity contour mapped on the surfaces of the primary heat exchangers 116.

Figure 8A:
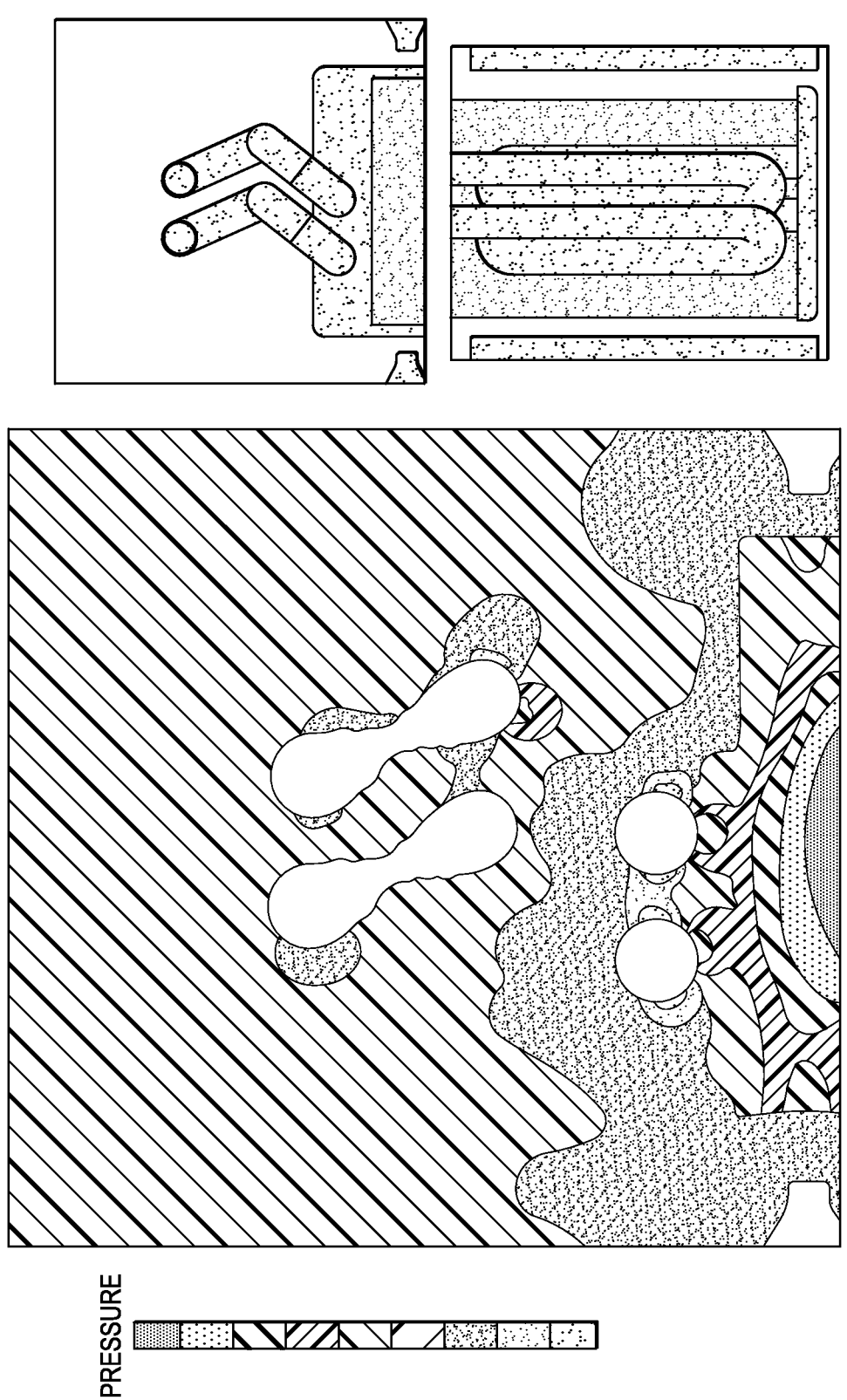
FIG. 8A is a normalized pressure drop contour of airflow circulation through a prior art furnace comprising no baffles.

Referring now to Prior Art FIG. 8A, an orthogonal front view of a computational fluid dynamic analysis of a normalized pressure drop contour of circulation airflow through a prior art furnace cabinet comprising no baffles is shown.

Figure 8B:
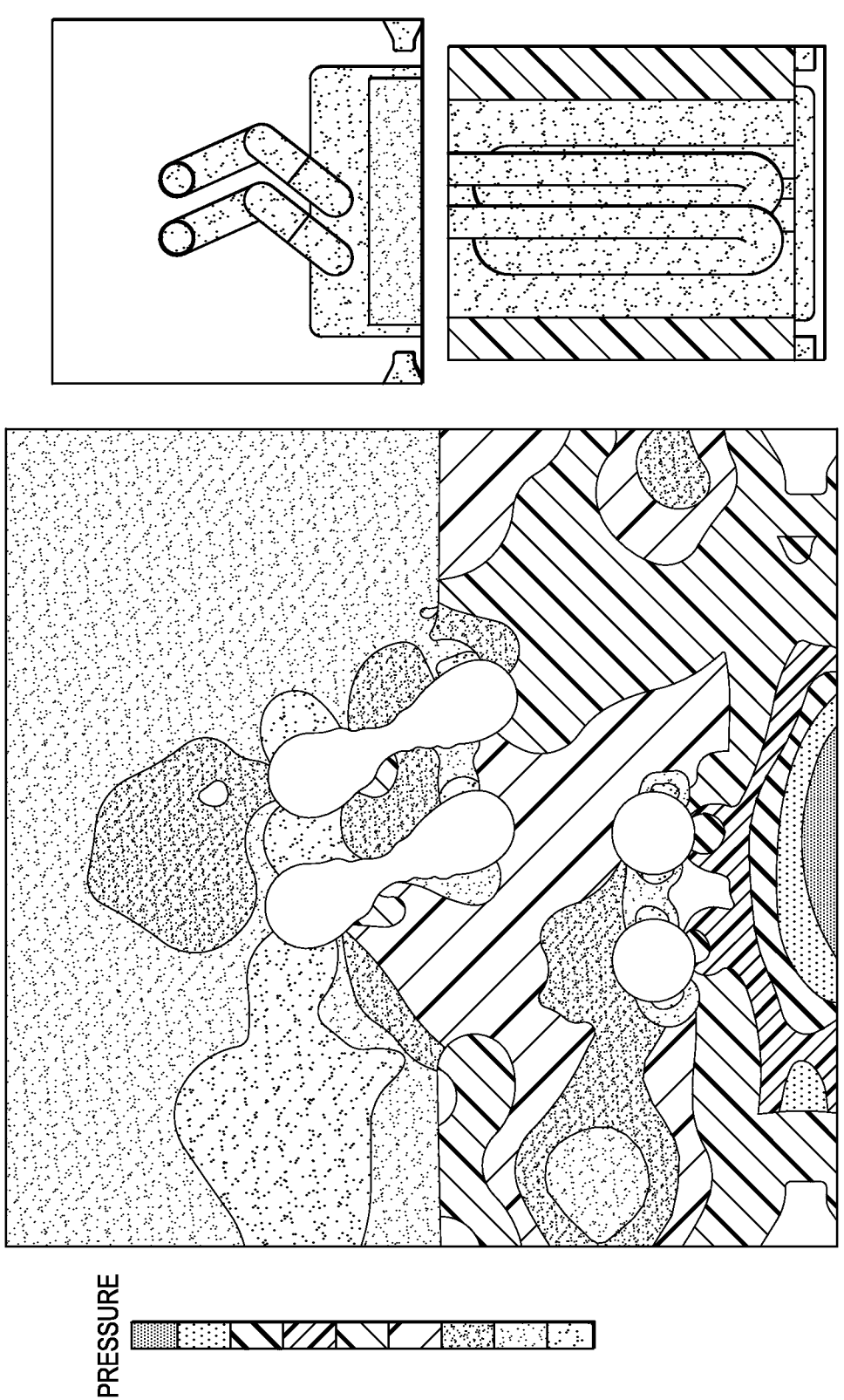
FIG. 8B is a normalized pressure drop contour of airflow circulation through a prior art furnace comprising two bluntly located baffles.

Referring now to Prior Art FIG. 8B, an orthogonal front view of a computational fluid dynamic analysis of a normalized pressure drop contour of circulation airflow through a prior art furnace cabinet comprising two bluntly located baffles is shown.

Figure 8C:
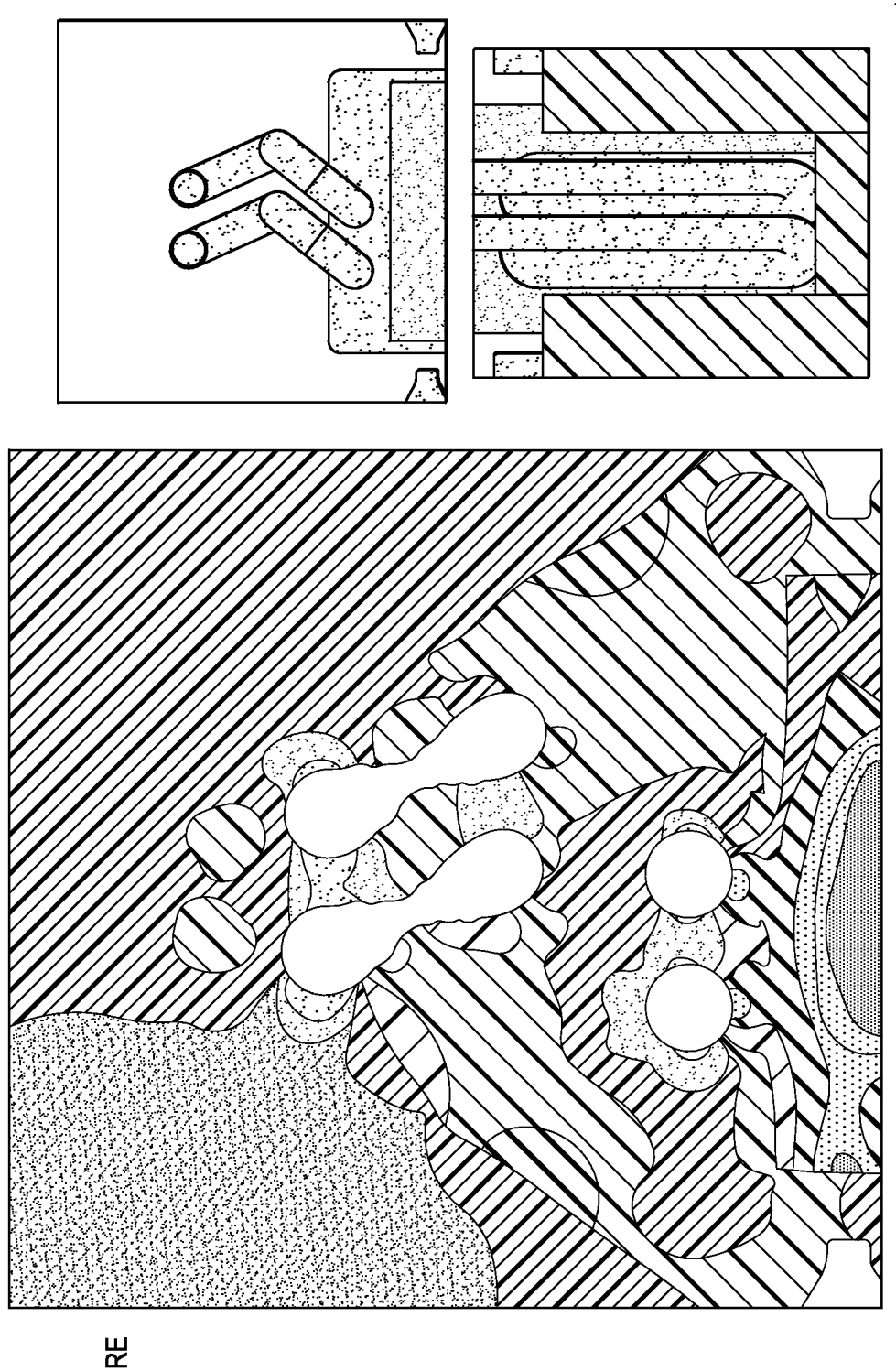
FIG. 8C is a normalized pressure drop contour of airflow circulation through the furnace cabinet of FIGS. 3-5 according to an embodiment of the disclosure.

Referring now to FIG. 8C, an orthogonal front view of a computational fluid dynamic analysis of a normalized pressure drop contour of circulation airflow through the furnace 100 is shown.

Figure 9A:
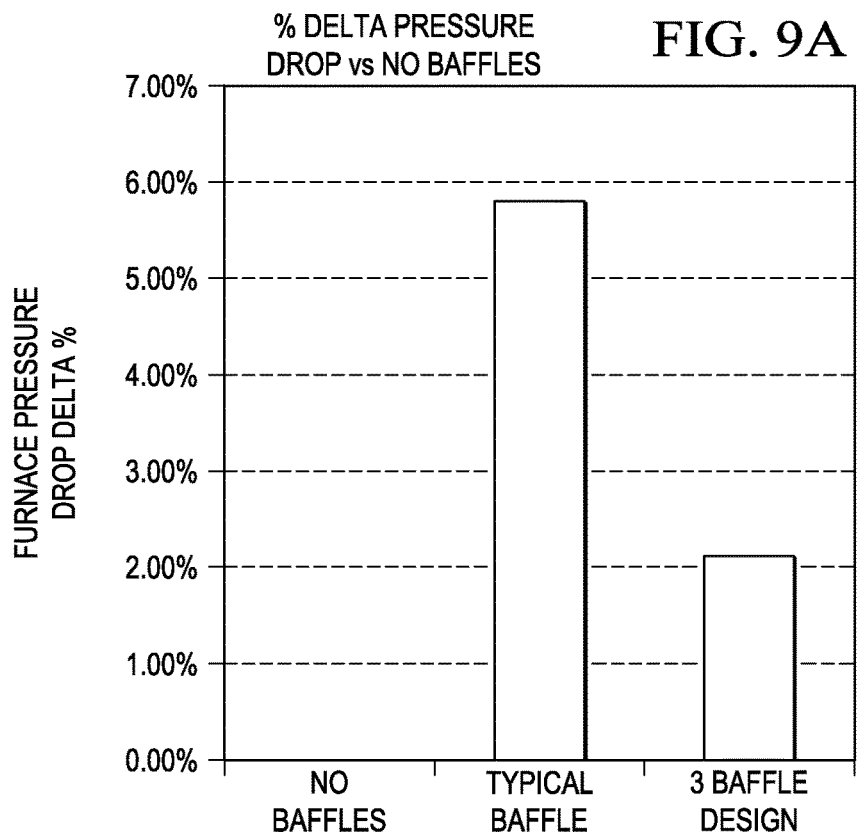
FIG. 9A is a chart comparing percent changes in pressure drop amongst a prior art furnace cabinet comprising no baffles, a prior art furnace cabinet comprising two bluntly located baffles, and the furnace cabinet of FIGS. 3-5 according to an embodiment of the disclosure.

Referring now to FIG. 9A, a chart showing a percentage change in pressure drop across the furnace 100 (3 baffle design) as compared to each of a prior art furnace comprising no baffles and a prior art furnace comprising typical baffles (two bluntly located baffles) is provided.

Figure 9B:
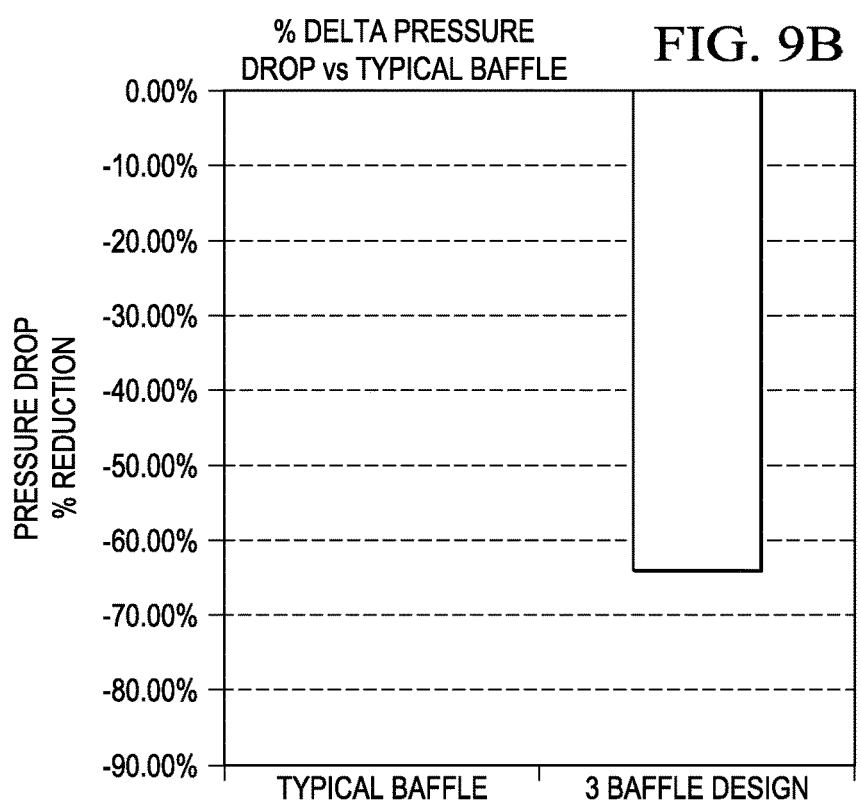
FIG. 9B is a chart comparing percent changes in pressure drop of a prior art furnace cabinet with two bluntly located baffles and the furnace cabinet of FIGS. 3-5 according to an embodiment of the disclosure.

Referring now to FIG. 9B, a chart showing a percentage pressure drop reduction comparison between the furnace 100 (3 baffle design) and a prior art furnace comprising typical baffles (two bluntly located baffles) is provided.

It will be appreciated that the location and/or dimensions of the baffles 216, 218, 220 disclosed herein may be altered and/or optimized for use with alternative arrangements of primary heat exchangers 116 and/or secondary heat exchangers 118.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A furnace, comprising:
a furnace cabinet;
a primary heat exchanger comprising a tubular member that is configured to receive a flow of combustion flue gases therethrough;
a blower configured to produce a flow of air through the furnace cabinet, outside of the tubular member;
a first baffle carried by a first wall of the furnace cabinet;
a second baffle carried by a second wall of the furnace cabinet, wherein the second baffle is located opposite the first baffle, and wherein the second wall is located opposite the first wall; and
a third baffle carried by a third wall of the furnace cabinet, wherein the third baffle comprises a bent plate extending from the third wall of the furnace cabinet, and wherein the third baffle begins protruding toward a center of the furnace cabinet from a location substantially equal to a most downstream portion of each of the first baffle and the second baffle with respect to a direction of the flow of air through the furnace cabinet, and
wherein the first baffle, the second baffle, and the third baffle are configured to direct the flow of air toward the primary heat exchanger as the flow of air passes the primary heat exchanger.

2. The furnace of claim 1, further comprising a secondary heat exchanger located upstream relative to the primary heat exchanger with regard to a location within a circulation airflow path, wherein each of the first baffle and the second baffle begin protruding toward a center of the furnace cabinet from locations downstream relative to the secondary heat exchanger.

3. The furnace of claim 2, wherein each of the first baffle and the second baffle begin protruding toward a center of the furnace cabinet from locations upstream relative to a most downstream portion of the primary heat exchanger.

4. The furnace of claim 3, wherein each of the first baffle and the second baffle overlap at least a portion of the primary heat exchanger along the direction of the flow of air through the furnace cabinet.

5. The furnace of claim 1, wherein the third baffle comprises a width substantially equal to a width of a minimum gap between the first baffle and the second baffle.

6. The furnace of claim 5, wherein the third baffle increasingly protrudes forward so that a forward edge of the third baffle is generally aligned with the most downstream portion of the primary heat exchanger as viewed from a front of the furnace with respect to the direction of the flow of air through the furnace cabinet.

7. The furnace of claim 1, wherein the first baffle, the second baffle, and the third baffle are further configured to direct the flow of air toward a rear of the furnace cabinet so that the flow of air is prevented from bypassing the primary heat exchanger.

8. The furnace of claim 7, wherein the first baffle, the second baffle, and the third baffle increase a velocity of the flow of air along an upward vertical direction and as the flow of air passes the primary heat exchanger.

9. The furnace of claim 8, wherein each of the primary heat exchanger and the secondary heat exchanger are removable from the furnace cabinet by sliding both the primary heat exchanger and the secondary heat exchanger away from the third wall.

10. A method of operating a furnace, comprising:
providing a furnace comprising a furnace cabinet, a blower, a primary heat exchanger, a first baffle carried by a first wall of the furnace cabinet, a second baffle carried by a second wall of the furnace cabinet, wherein the second baffle is located opposite the first baffle, and wherein the second wall is located opposite the first wall, and a third baffle carried by a third wall of the furnace cabinet;
flowing combustion flue gases through the primary heat exchanger;
producing a flow of air through the furnace cabinet with the blower;
directing the flow of air towards the primary heat exchanger with each of the first baffle, the second baffle, and the third baffle;
transferring heat from the primary heat exchanger to the flow of air;
protruding the third baffle towards a center of the furnace cabinet; and
increasingly protruding the third baffle forward so that a forward edge of the third baffle is generally aligned with a most downstream portion of the primary heat exchanger as viewed from a front of the furnace with respect to a direction of the flow of air through the furnace cabinet.

11. The method of claim 10, further comprising:
protruding each of the first baffle and the second baffle towards the center of the furnace cabinet from locations downstream relative to a secondary heat exchanger of the furnace with respect to the direction of the flow of air through the furnace cabinet, wherein the secondary heat exchanger is located upstream relative to the primary heat exchanger with respect to the direction of the flow of air through the furnace cabinet.

12. The method of claim 11, further comprising:
protruding each of the first baffle and the second baffle towards the center of the furnace cabinet from locations upstream from the most downstream portion of the primary heat exchanger relative to the direction of the flow of air through the furnace cabinet.

13. The method of claim 12, further comprising:
overlapping at least a portion of the primary heat exchanger with the first baffle and the second baffle along the direction of the flow of air through the furnace cabinet.

14. The method of claim 13, further comprising:
extending the first and second baffles from the third wall.

15. The method of claim 14, further comprising:
directing the flow of air toward a rear of the furnace cabinet; and preventing the flow of air from bypassing the primary heat exchanger during the directing the flow of air toward the rear of the furnace cabinet.

16. The method of claim 15, further comprising:
increasing a velocity of the flow of air along an upward vertical direction and as the flow of air passes the primary heat exchanger.

17. A furnace, comprising:
a furnace cabinet;
a primary heat exchanger comprising a tubular member configured to receive a flow of combustion flue gases therethrough;
a blower configured to induce a flow of air through the furnace cabinet, outside of the tubular member;
a first baffle carried by a first wall of the furnace cabinet;
a second baffle carried by a second wall of the furnace cabinet, wherein the second baffle is located opposite the first baffle, and wherein the second wall is located opposite the first wall; and
a third baffle carried by a third wall of the furnace cabinet, wherein the third baffle protrudes toward a center of the furnace cabinet, and wherein the third baffle increasingly protrudes forward so that a forward edge of the third baffle is generally aligned with the most downstream portion of the primary heat exchanger as viewed from a front of the furnace relative to a direction of the flow of air through the furnace cabinet, and
wherein the first baffle, the second baffle, and the third baffle are configured to direct the flow of air toward the primary heat exchanger as the flow of air passes the primary heat exchanger.

18. A furnace, comprising:
a furnace cabinet;
a primary heat exchanger comprising a tubular member configured to receive a flow of combustion flue gases therethrough;
a blower configured to induce a flow of air through the furnace cabinet, outside of the tubular member;
a first baffle carried by a first wall of the furnace cabinet, wherein the first baffle extends toward a center of the furnace cabinet;
a second baffle carried by a second wall of the furnace cabinet, wherein the second baffle is located opposite the first baffle, and wherein the second wall is located opposite the first wall, wherein the second baffle extends toward the center of the furnace cabinet, wherein a distance between the first baffle and the second baffle tapers in a downstream direction relative to a direction of the flow of air through the furnace cabinet; and
a third baffle carried by a third wall of the furnace cabinet, wherein the third baffle comprises a bent plate extending from the third wall of the furnace cabinet, and wherein the third baffle begins protruding toward the center of the furnace cabinet from a position on the third wall that substantially corresponds with a shortest distance between the first and second baffles, and
wherein the first baffle, the second baffle, and the third baffle are configured to direct the flow of air toward the primary heat exchanger as the flow of air passes the primary heat exchanger.

* * * * *